United States Patent [19]

Aoyagi et al.

[11] Patent Number: 4,607,300
[45] Date of Patent: Aug. 19, 1986

[54] AUTOMATICALLY REVERSIBLE TAPE DECK

[75] Inventors: Yoshio Aoyagi; Yukihiro Kaneko; Masanori Kurosaki; Minoru Motohashi; Manabu Sawaki; Yoshiharu Ueki; Shosaburo Sakaguchi, all of Saitama, Japan

[73] Assignee: Pioneer Electronic Corporation, Saitama, Japan

[21] Appl. No.: 497,972

[22] Filed: May 25, 1983

[51] Int. Cl.$^4$ .................. G11B 15/48; G11B 27/10
[52] U.S. Cl. .................. 360/74.1; 360/74.2; 360/74.4; 360/72.2; 360/71
[58] Field of Search .................. 360/72.1–72.3, 360/74.1, 74.2, 74.4, 74.5, 71, 90, 10.3, 74.3, 74.6, 74.7

[56] References Cited

U.S. PATENT DOCUMENTS

| | | | |
|---|---|---|---|
| 3,604,714 | 9/1971 | Staar | 360/74.2 |
| 3,614,341 | 10/1971 | Cannon | 360/74.4 |
| 4,215,378 | 7/1980 | Sato et al. | 360/74.1 |
| 4,270,152 | 5/1981 | Ida | 360/74.4 |
| 4,290,081 | 9/1981 | Foerster | 360/10.3 |
| 4,301,482 | 11/1981 | Trevithick | 360/74.4 |
| 4,342,056 | 7/1982 | Ishii et al. | 360/74.4 |
| 4,386,380 | 5/1983 | Ueki | 360/74.1 |
| 4,423,443 | 12/1983 | Ueki et al. | 360/74.1 |
| 4,463,393 | 7/1984 | Ueki et al. | 360/74.1 |
| 4,475,134 | 10/1984 | Bowden et al. | 360/74.1 |
| 4,511,931 | 4/1985 | Bixby | 360/10.3 |

FOREIGN PATENT DOCUMENTS

| | | | |
|---|---|---|---|
| 54-73008 | 6/1979 | Japan | 360/69 |
| 57-143774 | 9/1982 | Japan | 360/71 |

Primary Examiner—Raymond F. Cardillo
Assistant Examiner—Steven R. Garland
Attorney, Agent, or Firm—Sughrue, Mion, Zinn, Macpeak, and Seas

[57] ABSTRACT

An auto-reverse tape deck is provided with an automatic stop feature such that, regardless of the initial tape position, playback is halted substantially at the starting position after one complete reciprocation of the tape. If playback begins in the midst of a music interval, the device may play to the end of this interval after one complete reciprocation before being stopped.

18 Claims, 4 Drawing Figures

AUTOMATICALLY REVERSIBLE TAPE DECK

BACKGROUND OF THE INVENTION

The present invention relates to an automatically reversible tape deck, and particularly to an automatically reversible tape deck in which the reproducing operation is automatically stopped when the tape thereon has been substantially once reciprocated.

FIG. 1 shows the arrangement of a conventional tape deck of the type mentioned above, which comprises a tape deck mechanism 1, an end detecting means 2 responsive to the tape deck mechanism 1 for detecting an end of the tape to produce an end detection signal, a counter 3 which receives the end detection signal from the end detecting means as a clock signal, and a controller 4 for controlling the rotation of a motor or motors and the position for the head of the mechanism 1 in accordance with the operational mode. The controller 4 produces a reproduction start signal to clear the counter 3 when reproduction is started, and controls the mechanism 1 so as to stop the reproducing operation in response to a count output produced by the counter 3.

The operation of the conventional automatically reversible tape deck of FIG. 1 will now be described. The end detecting means 2 detects an end of the tape by utilizing, for example, a pulse generated in accordance with the rotation of a tape reel in the tape deck mechanism 1 and supplies an end detection signal to the counter 3. The counter 3 counts the end detection signal so as to produce a count output when the count reaches "2". The count output is supplied to the controller 4 as a stop request signal. The controller 4 controls the tape deck mechanism 1 so as to stop the reproduction operation when a stop request signal is produced from the counter 3 and, for example, also ejects the tape cassette. At other times, the controller 4 normally controls the tape deck mechanism 1 so as to reverse the reproduction direction of the tape cassette in response to the end detection signal produced from the end detecting means 2.

Thus, when the end of the tape has been twice detected in the reproduction operation, that is, when one reciprocating reproduction operation has been completed, the tape cassette is ejected to thereby inform the operator of the completion of the reproduction operation. The contents of the counter 3 are cleared in response to a reproduction start signal produced from the controller 4 so that the above-mentioned operation is performed each time after the reproduction operation has been started.

In the conventional tape deck which is simply arranged such that the tape cassette is ejected when the end of the tape has been twice detected in the reproduction operation, there is a disadvantage in that not all of the information on the tape cassette can be reproduced when reproduction starts under the condition that the tape is already wound to some degree, because it is necessary to reproduce the tape from the starting end portion thereof when all of the information thereon is to be reproduced.

SUMMARY OF THE INVENTION

The invention is intended to eliminate the abovementioned disadvantage in the conventional tape deck, and an object of the present invention is thus to provide an automatically reversible tape deck in which all of the information on the tape can be reproduced regardless of the initial wound state of the tape.

In an automatically reversible tape deck according to the present invention, the reproduction position of the tape is detected in accordance with the travelling direction of the tape to produce a stop request signal at a reproduction start position or at a predetermined position after the initiation of reproduction so that the reproduction operation is stopped in response to the stop request signal.

DETAILED DESCRIPTION OF THE PREFERRED EMBODIMENTS

Figure 1:
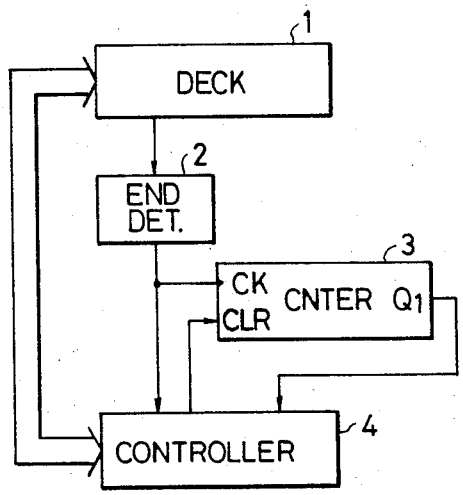
FIG. 1 is a block diagram illustrating a conventional auto-reverse tape deck arrangement.
Figure 2:
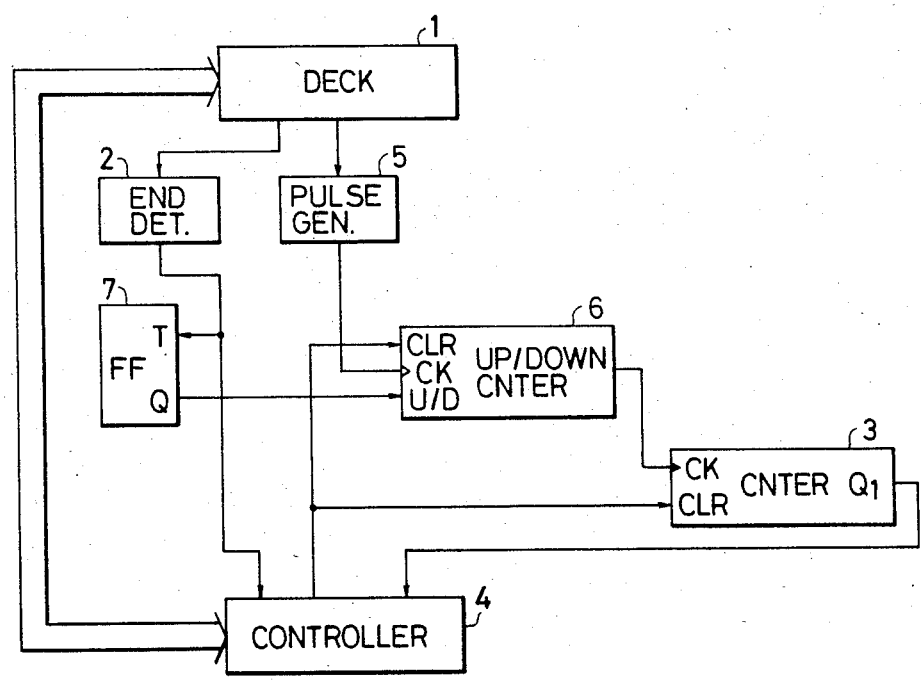
FIG. 2 is a block diagram illustrating a first embodiment of the present invention.

FIG. 2 illustrates a first embodiment of the present invention, in which the parts equivalent to those in FIG. 1 are represented by the same reference numerals. In FIG. 2, the automatically reversible tape deck comprises a tape deck mechanism 1, an end detecting means 2, a counter 3, a controller 4, and a pulse generating means 5 for generating a pulse signal in accordance with the travel of the tape on the basis of, for example, the rotation of a tape reel of the mechanism. Each of the end detecting means 2 and the pulse generating means 5 may be known devices. The automatically reversible tape deck further comprises an up/down counter 6 for counting the pulse signals from the pulse generating means 5, to produce a pulse output when the content thereof is "0", this pulse output being supplied as a clock input to the counter 3, and a T-type flip-flop 7 receiving the end detection signal of the end detecting means 2 as a trigger input to control the counting direction of the up/down counter 6.

The operation of the thus arranged embodiment will now be described. When the playback operation is to be started, a reproduction start signal is produced from the controller 4, and the counters 3 and 6 are cleared by this signal. Thereafter, the up/down counter 6 upwardly or downwardly counts pulse signals produced from the pulse generating means 7 in accordance with the state of the T-type flip-flop 7. Upon detecting an end of the tape, the end detecting means 2 produces an end detection signal and applies the same to the controller 4 and the T-type flip-flop 7. In response to this end detection signal, the controller 4 controls the tape deck mechanism 1 to cause it to reverse the reproduction direction, and the T-type flip-flop 7 reversesits own state to thereby change the counting mode of the up/down counter 6. The up/down counter 6 produces a clock pulse and applies the same to the counter 3 every time the count content of the up/down counter becomes "0". The counter 3 produces a stop request signal and applies the same to the controller 4 when the count content of the counter 3 becomes "2". In response to the stop request signal, the controller 4 stops the playback operation and controls the tape deck mechanism 1 to cause it, for example, to eject the tape cassette.

The up/down counter 6 starts its counting operation, for example, in the upward mode. When an end of the tape has been reached, the counting mode of the up/down counter 6 is reversed so that it begins to subtract from its count content until the count values becomes "0" at the reproduction start position (the tape head, however, now tracks the other tape channel or track). The up/down counter continues to further subtract from its count value until another tape end is reached, at which time the counting mode is again reversed to effect addition. When the reproduction start position is again reached, the count of the up/down counter 6 becomes "0". Thus, a double detection of the "0" value of the up/down counter 6 by the counter 3 indicates the fact that the tape started from the reproduction start positon has again come back thereto. In this manner, it is made possible to automatically stop the reproduction operation after all of the information on the tape has been reproduced, (i.e. one complete reciprocation) regardless of the initial wound state of the tape.

Figure 3:
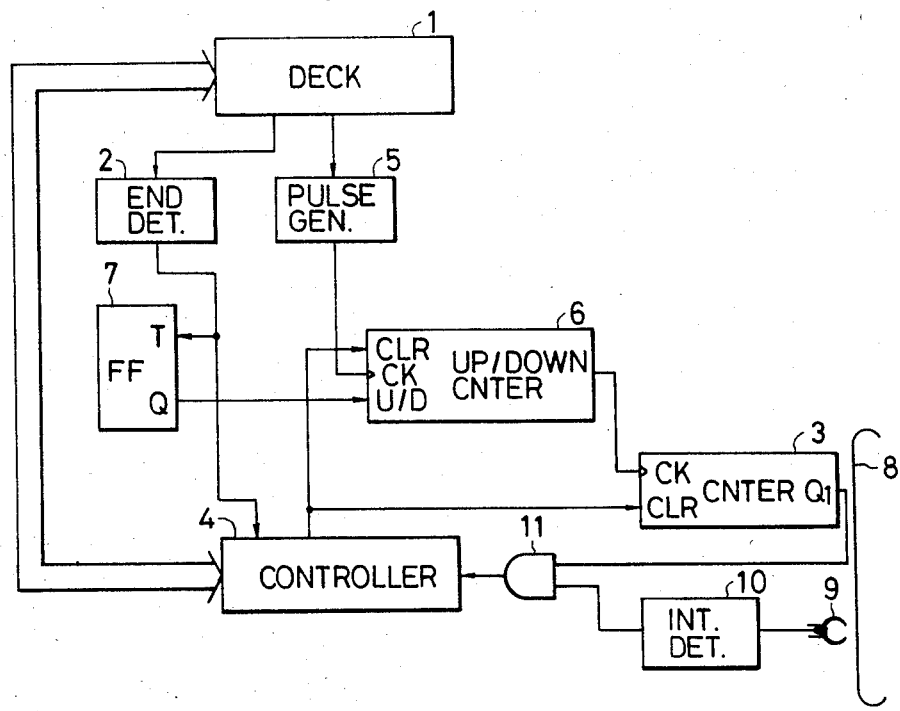
FIG. 3 is a block diagram illustrating a second embodiment of the present invention.

FIG. 3 is a circuit diagram of a second embodiment of the present invention, in which the same reference numerals as those used in FIG. 2 denote the same components. In this embodiment, an arrangement is provided such that a music interval detecting means 10 detects an intermusic interval on the basis of reproduced information picked up from a tape 8 by a playback head 9. The output of an AND gate 11, which receives at one input an interval signal from the interval detecting means 10 and at the other the count signal from the counter 3 is applied to a controller 4 as a stop request signal. The remaining arrangement is the same as that in the FIG. 2 embodiment. Thus, the playback operation is stopped and, for example, the tape cassette is ejected when an intermusic interval is detected after a full reciprocation of reproduction has been completed. It is thus possible to avoid any unpleasantness caused by sudden ejection of the tape cassette in the midst of music.

Figure 4:
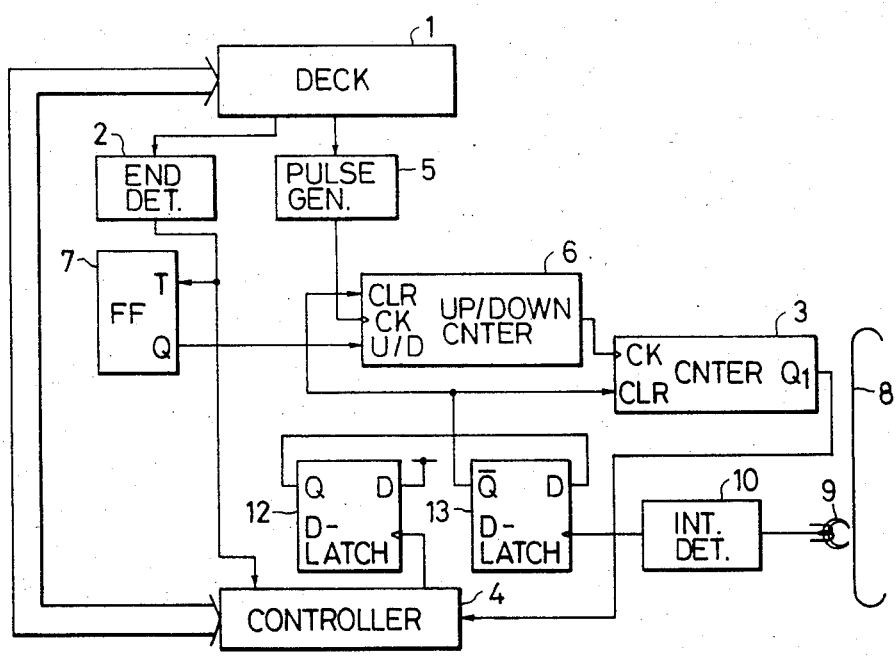
FIG. 4 is a block diagram illustrating a third embodiment of the present invention.

FIG. 4 is a circuit diagram of a third embodiment of the present invention, in which the same reference numerals as those used in FIG. 3 denote the same components. In this embodiment, the arrangement is such that a D-latch 12, with its D input coupled to a high reference level, temporarily holds the reproduction start signal from controller 4 until an intermusic interval signal is produced from a music interval detecting means 10 to set a D-latch 13 so that counters 3 and 6 are cleared by a $\overline{Q}$-output of the D-latch 13. The remaining arrangement is the same as that in the second embodiment. Thus, the up/down counter 6 begins its counting operation from an intermusic interval position after reproduction has been started, so that the tape may be stopped at this interval position substantially after one reciprocation of the tape, with the same advantages as obtained in the second embodiment.

The counting mode of the up/down counter 6 may be controlled by a signal which is supplied by the controller 4 and which represents the reproduction direction of the tape, while a T-type flip-flop 7 is used to control the counting mode of the up/down counter 6 in each of the above-described embodiments. Alternatively, the T-type flip-flop 7 may be replaced by a flip-flop provided with a clear terminal to which the reproduction start signal is applied as a clear input, to cause the up/down counter 6 to always operate in the upward mode when the reproduction pperation is started, so that a carrier output of the up/down counter 6 may be used as a stop request signal to thereby make it possible to eliminate the counter 3.

As described above in detail, according to the present invention, the playback operation may be stopped at the reproduction start position or at an intermusic interval position after the reproduction operation has been started, regardless of the initial wound state of the tape, so that all of the information stored on the tape can be completely reproduced.

What is claimed is:

1. An automatic reverse tape deck of the type for commencing a reproduction operation at a first position of a tape while said tape travels in a first direction, reversing the direction of tape travel when said tape reaches a second position and continuing said reproduction operation while said tape travels in a second direction opposite said first direction and past said first position, and reversing the direction of tape travel when said tape reaches a third position and continuing said reproduction operation while said tape again travels in said first direction, said tape deck including position detecting means for detecting the position of said tape and control means for interrupting said reproduction operation after said position detecting means detects the arrival of said tape at said first position while said tape is traveling in said first direction after direction reversals at said second and third positions.

2. A tape deck according to claim 1, further including means for detecting an unrecorded portion of tape, wherein said control means interrupts aaid reproduction operation at the first unrecorded portion of tape occurring after said first position while said tape is traveling in said first direction after direction reversals at said second and third positions.

3. A tape deck according to claim 2, wherein said control means interrupts said reproduction operation in response to a stop request signals and said position detecting means provides an output signals upon detecting that the tape is at said first position while traveling in said first direction after direction reversals at said second and third positions, said tape deck further including signal detection means for detecting recorded and unrecorded portions of tape and for providing an output signals upon detecting an unrecorded portion of tape, and means responsive to said output signal from said signal detection means for passing said output signal of said position detecting means to said control means as said stop request signal.

4. A tape deck according to claim 3, wherein said position detecting means comprises pulse generating means for generating pulses indicative of tape movement, said position detecting means further comprising an up down counter for counting said pulse signals, and means receiving an end detection signal from an end detecting means for generating an instruction signal to said up/down counter to change the counting direction thereof.

5. A tape deck according to claim 4, said means receiving said end detection signal comprising a flip flop circuit, and further comprising a second counter clocked by said up down counter each time said up/down counter reaches a predetermined value.

6. A tape deck according to claim 5, wherein said control means includes means issuing a reproduction start signal at the initiation of reproduction for clearing said up/down counter and said second counter.

7. A tape deck according to claim 6, said second counter producing an output signal upon being twice clocked by said up/down counter, the output signal of said second counter and an output of said signal detection means forming two inputs to AND means, said AND means generating said stop request signal, whereby said reproduction operation is stopped at a position of a music interval firstly detected by said position detection means not before a position at which reproduction was started.

8. A tape deck according to claim 2, wherein said position detecting means monitors the position of said tape only after receiving an enabling signal, said tape deck further including reproduction signal detection means for detecting recorded and unrecorded portions of said tape and for providing said enabling signal to said position detecting means upon the detection of a first unrecorded portion of tape after the commencement of said reproduction operation at said first position.

9. A tape deck according to claim 8, wherein said position detecting means includes pulse generating means for generating pulses indicative of tape travel, and wherein said position detecting means further comprises an up/down counter for counting said pulse signals and means receiving an end detection signal from an end detecting means for generating an instruction signal to said up/down counter to change the counting direction thereof.

10. A tape deck according to claim 9, said means receiving said end detection signal comprising a flip flop circuit, and further comprising a second counter clocked by said up/down counter each time said up/down counter reaches a predetermined value.

11. A tape deck according to claim 10, wherein said control means includes means for issuing a reproduction start signal at the initiation of reproduction, and further including latch means for temporarily holding said reproduction start signal until the receipt of an output from said reproduction signal detection means, and for then forwarding said reproduction start signal to clear inputs of said second counter and said up/down counter.

12. A tape deck according to claim 6, wherein said control means stops said reproduction operation in response to a stop request signal, said second counter producing said stop request signal upon being twice clocked by said up/down counter.

13. A tape deck according to claim 1, wherein said position detecting means includes first signal generating means for generating position signals representing positions of said tape and second signal generating means for generating a direction signal indicative of the direction of tape travel, said control means being responsive to said first and second signals for stopping said reproduction operation after said tape reaches said first position while traveling in said first direction after direction reversals at said second and third positions.

14. A tape deck according to claim 13, wherein said first signal generating means comprises pulse generating means for generating pulses indicative of tape travel and counter means for counting said pulses in a direction corresponding to the direction of tape travel.

15. A tape deck according to claim 14, wherein said counter means comprises an up/down counter for counting said pulse signals, said second signal generating means comprising means for generating an end detection signal each time one of said second or third positions is reached and means responsive to said end detection signal for changing said direction signal, said direction signal being provided as a count direction instruction signal to said up/down counter.

16. A tape deck according to claim 15, said means responsive to said end detection signal comprising a flip flop circuit, and further comprising a second counter clocked by said up/down counter each time said up/down counter reaches a predetermined value.

17. A tape deck according to claim 16, wherein said control means includes means issuing a reproduction start signal at the initiation of reproduction for clearing said up/down counter and said second counter.

18. A tape deck according to claim 17, wherein said control means stops said reproduction operation in response to a stop request signal, said second counter producing said stop request signal upon being twice clocked by said up/down counter.

* * * * *